Jan. 1, 1935.  A. E. MOSHER  1,986,742

POCKET LIVE MINNOW JAR

Filed Aug. 16, 1934

Inventor
Audley E. Mosher,
By L. F. Randolph Jr.
Attorney

Patented Jan. 1, 1935

1,986,742

UNITED STATES PATENT OFFICE 1,986,742

POCKET LIVE MINNOW JAR

Audley E. Mosher, Elkland, Pa.

Application August 16, 1934, Serial No. 740,174

1 Claim. (Cl. 43—55)

The invention relates to a jar or receptacle for carrying live minnows in the pocket of the fisherman so that he may have the advantage of live bait at hand at all times while fishing, and has for its principal object the provision of a device of the character stated that is capable of being carried in the fisherman's pocket, and is adapted to hold a sufficient quantity of water to maintain minnows in a live condition, and that is water-tight.

A further object of the invention is the provision of manually operated means that is retained in the jar for lifting the minnows out of the water when it is desired to select one for baiting the hook, said means comprising a perforated tray having upright flanged side edges, and a rod secured thereto and extending to the top of the jar or receptacle for convenience in lifting and lowering the tray relatively to the jar.

Figure 1:
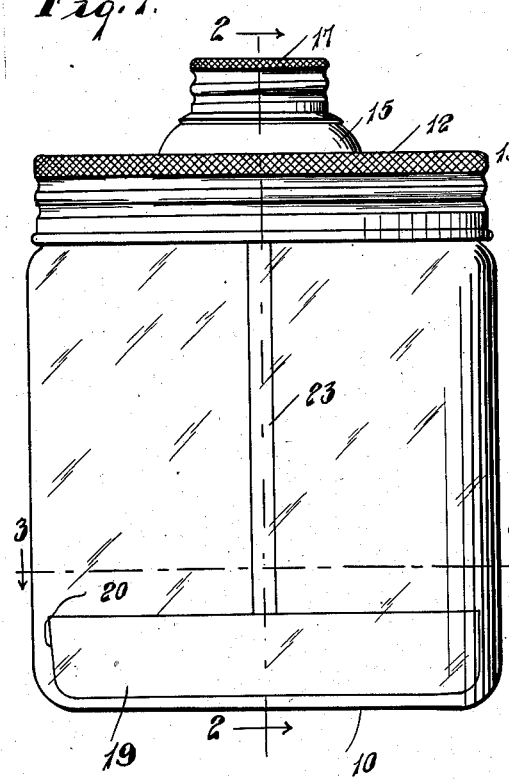
Figure 2:
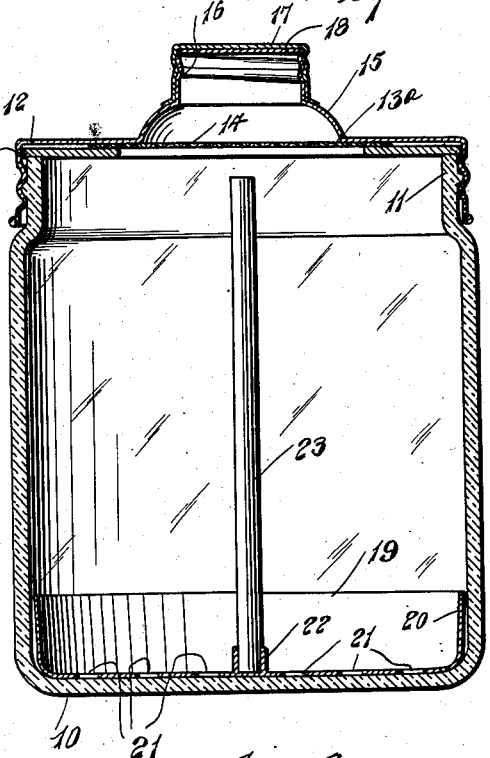
Figure 3:
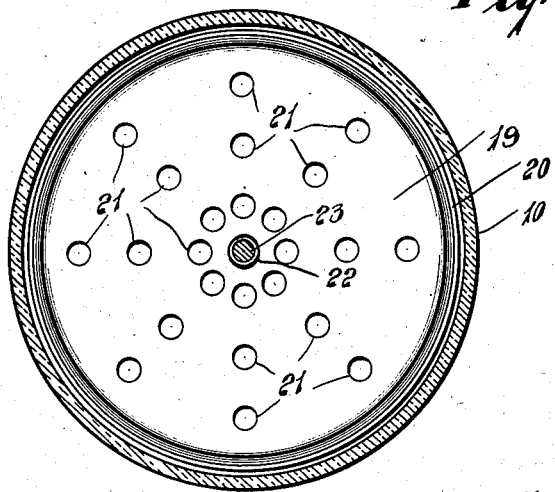

The invention will be described in detail hereinafter and will be found illustrated in the accompanying drawing, in which Figure 1 is a side view in elevation of the improved pocket live minnow jar, Figure 2 is a vertical sectional view on a plane indicated by the line 2—2 of Figure 1, and Figure 3 is a horizontal sectional view on a plane indicated by the line 3—3 of Figure 1.

In the drawing similar reference characters are used to designate corresponding parts in all the views.

As shown in the drawing the minnow jar or receptacle is made preferably of a glass container 10, having a threaded neck 11 on which is mounted a threaded cover 12, 13 designating a gasket between the cover and the edge of the neck to prevent leakage of the water contained in the jar.

The cover 12 is provided with an opening 13$^a$ and 14 is a wire mesh panel over the opening 13$^a$. 15 is an enclosure or spout arranged in alinement with the opening 13$^a$ and having a threaded extension 16 to receive a threaded cover 17 to close said enclosure or spout, 18 designating a gasket between the cover 17 and the edge of the extension 16 to secure a water-tight fit therebetween. The purpose of this construction is to enable the fisherman to empty the water in the jar without permitting loss of the fish and to refill it through the nozzle by dipping the jar in water or pouring it therein as may be preferred. Also it will be understood that the jar may be ventilated by removing the cover 17 to prevent suffocation of the fish.

19 designates a tray mounted in the jar or receptacle 10 having upstanding side walls 20. The bottom of the tray 19 is provided with a plurality of openings 21, and has an upstanding nipple 22 in which is secured an upstanding rod 23 that extends nearly to the top to enable the fisherman to raise the tray and lift the minnows to the top portion of the jar or receptacle so that he may select one of the minnows for bait as desired, the openings 21 providing for quickly raising and lowering the tray by means of the rod 23.

What I claim is:—

In a minnow jar, a receptacle having a cylindrical threaded neck, a threaded cap mounted on said neck and having an opening therein, an enclosure surrounding said opening and having a tubular threaded extension communicating therewith, a threaded closure for said extension, a foraminous member secured over the opening in the cap, a tray contained in the receptacle having relatively high side walls and provided with openings, said tray corresponding in plan to the cross section of the receptacle and snugly fitted therein to enable lifting the minnows to the top for selection, and a rod secured to said tray for lifting it.

AUDLEY E. MOSHER.